United States Patent
Grabowski et al.

(10) Patent No.: US 12,537,234 B2
(45) Date of Patent: Jan. 27, 2026

(54) ENERGY STORE FOR AN ELECTRICALLY DRIVABLE MEANS OF TRANSPORTATION

(71) Applicant: Robert Bosch GmbH, Stuttgart (DE)

(72) Inventors: Johannes Grabowski, Reutlingen (DE); Joachim Joos, Gerlingen (DE); Walter Von Emden, Eningen Unter Achalm (DE); Andreas Keller, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 650 days.

(21) Appl. No.: 17/312,067

(22) PCT Filed: Dec. 16, 2019

(86) PCT No.: PCT/EP2019/085277
§ 371 (c)(1),
(2) Date: Jun. 9, 2021

(87) PCT Pub. No.: WO2020/120792
PCT Pub. Date: Jun. 18, 2020

(65) Prior Publication Data

US 2022/0029211 A1    Jan. 27, 2022

(30) Foreign Application Priority Data

Dec. 14, 2018    (DE) .......................... 102018221836.6

(51) Int. Cl.
*H01M 10/42*    (2006.01)
*B60L 50/64*    (2019.01)
(Continued)

(52) U.S. Cl.
CPC ......... *H01M 10/4257* (2013.01); *B60L 50/64* (2019.02); *B60L 58/19* (2019.02);
(Continued)

(58) Field of Classification Search
CPC .... H01M 10/42; H01M 10/48; H01M 10/441; H01M 10/4257; H01M 50/269;
(Continued)

(56) References Cited

U.S. PATENT DOCUMENTS 10,232,728 B2 *   3/2019   Butzmann .......... H01M 10/4257
10,286,805 B2 *   5/2019   Eun ......................... B60L 58/19

FOREIGN PATENT DOCUMENTS

CN    102265478 A    11/2011
CN    105322607 A    2/2016
(Continued)

OTHER PUBLICATIONS

International Search Report for PCT/EP2019/085277, Issued Apr. 9, 2020.
(Continued)

*Primary Examiner* — Karie O'Neill Apicella
(74) *Attorney, Agent, or Firm* — Norton Rose Fulbright US LLP

(57) ABSTRACT

An energy store including a housing, a first plurality of storage cells, a second plurality of storage cells, a first electrical pin configuration, a second electrical pin configuration, and a switching device. The switching device is configured to connect the first plurality of storage cells to the first electrical pin configuration, the second plurality of storage cells to the second electrical pin configuration and/or the first plurality of storage cells to the second plurality of storage cells.

20 Claims, 2 Drawing Sheets

(51) Int. Cl.
*B60L 58/19* (2019.01)
*H01M 10/44* (2006.01)
*H01M 10/48* (2006.01)
*H01M 50/204* (2021.01)
*H01M 50/269* (2021.01)
*H01M 50/296* (2021.01)
*H01M 50/509* (2021.01)

(52) U.S. Cl.
CPC ......... *H01M 10/441* (2013.01); *H01M 10/48* (2013.01); *H01M 50/204* (2021.01); *H01M 50/269* (2021.01); *H01M 50/296* (2021.01); *H01M 50/509* (2021.01); *B60L 2240/545* (2013.01); *B60L 2240/547* (2013.01); *H01M 2220/20* (2013.01)

(58) Field of Classification Search
CPC .............. H01M 50/296; H01M 50/509; H01M 50/204; B60L 50/64; B60L 58/19
See application file for complete search history.

(56) References Cited

FOREIGN PATENT DOCUMENTS

| | | | |
|---|---|---|---|
| CN | 106068203 | A | 11/2016 |
| DE | 69710369 | T2 | 11/2002 |
| DE | 102011087031 | A1 | 5/2013 |
| DE | 102014200336 | A1 | 7/2015 |
| DE | 102014208543 | A1 | 11/2015 |
| DE | 102018100156 | A1 | 7/2018 |

OTHER PUBLICATIONS

Anonymous, "Submarine Electrical Systems," Chapter 3, San Francisco Maritime National Park Association, 2013, pp. 1-42. <https://maritime.org/doc/fleetsub/elect/chap3.htm> Downloaded Jun. 8, 2021.

* cited by examiner

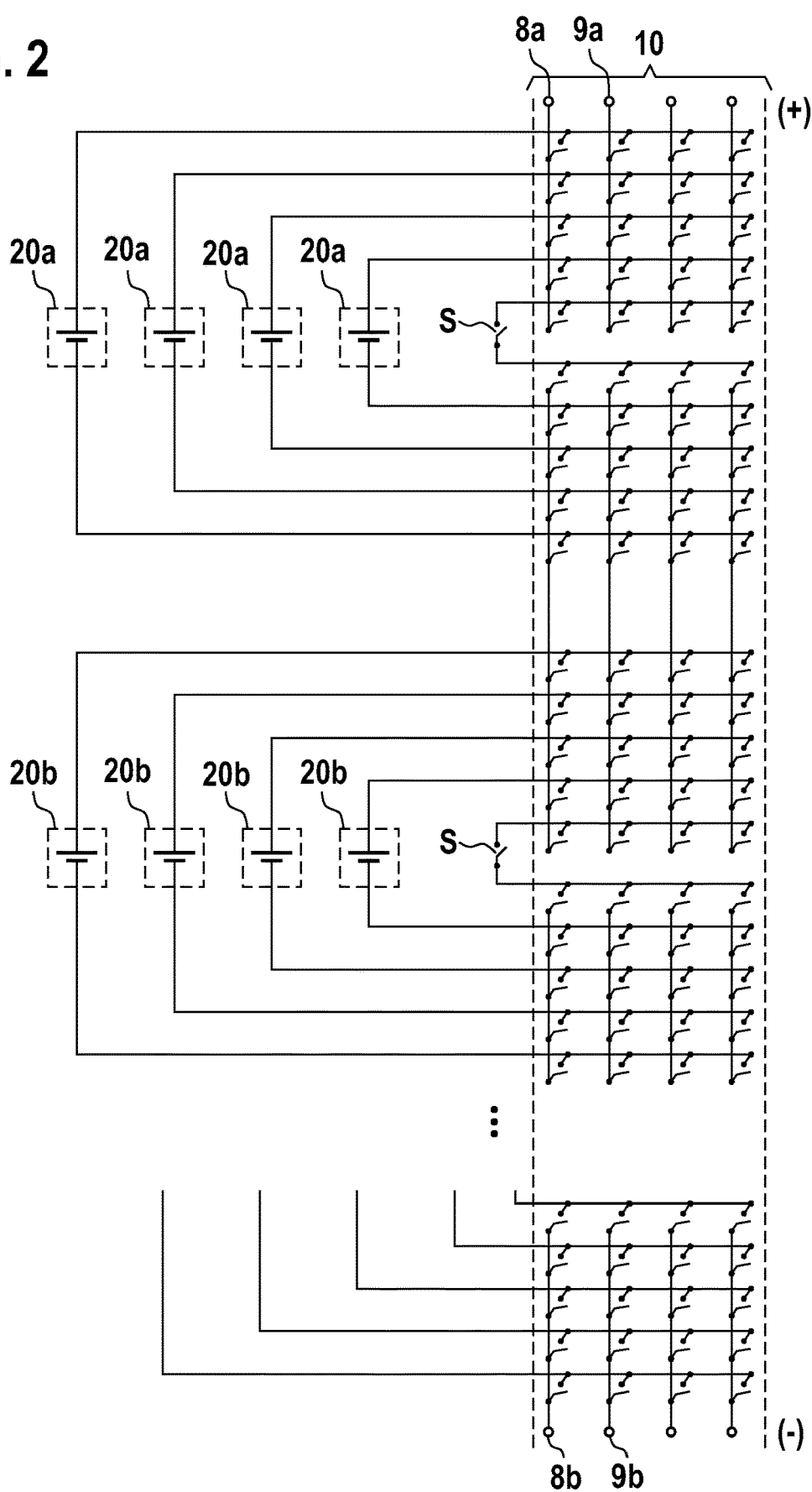

ENERGY STORE FOR AN ELECTRICALLY DRIVABLE MEANS OF TRANSPORTATION

FIELD

The present invention relates to an energy store, in particular for an electrically drivable means of transportation. In particular, the present invention relates to a flexible and energy-efficient operating manner of an energy store.

BACKGROUND INFORMATION

In addition to a passively interconnected battery pack, present electric car approaches include active components that involve an inverter, a DC/DC converter, additional 12 V/48 V batteries, power conversion units (energy converters, PCUs), soft start contactors and charge controllers. This tends to be a complex and cost-intensive system. As a result of the passive interconnection of the individual battery cells (for example at an individual source voltage of 3.7 V) and of the differences in internal resistance and capacity due to the manufacturing process, the individual cells are also loaded in a considerably different manner and possibly drift apart even further during operation. The capacity of the entire battery pack is thus determined by the performance of the cells having the worst state of health or the worst state of charge, as a result of which a derivative action becomes necessary that delimits the usable capacity to 60% through 80% of the rated capacity, in order to avoid harmful deep discharge of the cell having the lowest capacity. The object of the present invention is to shift the functionality into the individual cell, so that each individual cell may also be used optimally or may respond and, if necessary, contribute optimally to an external power demand (driving operation, working mode, or the like) or to a power supply (charging mode, recuperation mode, or the like).

SUMMARY

An example embodiment of the present invention provides a system that includes an ASIC, sensors, and switches, for example, each being possibly implemented on each individual battery cell. In other words, intelligent battery cells are usable as a basic unit for the present invention. The ASIC of the particular cell or of the particular system includes a memory/data memory that has an unambiguous identification, so that each battery cell is unambiguously assigned, and sensors that detect and store, for example, the temperature, currents, the number of charge/discharge cycles, the cell voltage and the possibly occurring faulty cells, for example due to deep discharge, high temperatures, etc. A bus system may make the communication of each individual cell with the consumers or the charging station possible. Active switches (for example MOSFETs) at each individual cell allow for various cells to be switched in series and/or in parallel and for corresponding voltages to be applied to different external consumers. An algorithm on each ASIC of a particular system of a particular cell may enable the particular cell to evaluate how the individual cell may contribute to the power demand or whether this does not make sense in the present case.

In other words, the above-mentioned object may achieved with the aid of an energy store that includes a housing, a first plurality of storage cells, a second plurality of storage cells, a first electrical pin configuration, a second electrical pin configuration, and a switching device, in accordance with an example embodiment of the present invention. The housing may be made of plastic, for example, to ensure resistance to acid and to be insensitive to corrosion. The storage cells of the first plurality of storage cells may be for example implemented as power cells, energy cells, and alternatively or additionally as a mix of the cells described above. For this purpose, individual or all of the first plurality of storage cells may also be designed as super caps. The same applies to the second plurality of storage cells. In particular, the first plurality of storage cells may have a different nature of storage cells than the second plurality of storage cells. In particular, all storage cells of the first plurality of storage cells are different in nature from the second plurality of storage cells (and/or vice versa). The first electrical pin configuration and the second electrical pin configuration may be provided to supply external consumers with electrical energy from the energy stores or from the storage cells. In this case, an electrical consumer may be supplied with electrical energy via the first electrical pin configuration, in particular independently from the second electrical pin configuration. In particular, the first electrical pin configuration and the second electrical pin configuration are configured to output different electrical voltages in that they are electrically connected to a different plurality of storage cells. For this purpose, the first plurality of storage cells is connected to the first electrical pin configuration, while the second plurality of storage cells is connected to the second electrical pin configuration. The switching device is moreover configured to also electrically selectively connect the first plurality of storage cells to the second plurality of storage cells. In this way, the energy, the voltage and/or the current intensity of the storage cells may be selectively output from the energy store via the first electrical pin configuration, the second electrical pin configuration and/or via the first as well as the second electrical pin configuration. The switching device may be configured to operate as a function of an operating condition of a machine to be supplied with electrical energy by the energy store or as a function of a corresponding means of transportation (i.e., a corresponding transportation device). In this way, the storage cells of the energy store may be supplied with energy by different terminal voltage characteristics, thus improving the use of an energy store according to the present invention with regard to the systems from the related art.

Preferred refinements of the present invention are disclosed herein.

In accordance with an example embodiment of the present invention, the first pin configuration and/or the second pin configuration may each include at least two electrical contacts, via which electrical energy of the storage cells may be transferred. Depending on the application or working mode of the energy store, it is thus possible to transfer electrical energy via the particular electrical contact from the first plurality of storage cells to the second plurality of storage cells and/or to output electrical energy to consumers situated outside of the housing. The electrical application of the particular electrical contacts takes place with the aid of the switching device of the energy store. An analysis of the necessity of activating the switching device within the energy store according to the present invention also takes place, in particular. This increases the flexibility when using the energy store according to the present invention and dispenses with the need for a higher-level logic/control unit and the wiring efforts connected thereto.

If within the scope of the present invention "energy cells" are mentioned, this refers to the nature of the plurality of storage cells to be essentially configured to provide a high amount of energy. In other words, the storage cells referred to as energy cells have the highest energetic capacity possible. In contrast thereto, "power cells" refers to the plurality of storage cells that are essentially configured to output great electrical power. The maximal power output of the power cells may be in particular considerably higher—as compared to their energetic capacity—than that of the energy cells described above. By using the storage cells of different characteristics, the energy store according to the present invention may be used to respond particularly appropriately and flexibly to requests for the provision of electrical energy.

The switching device may be configured, for example, to electrically decouple the first plurality of storage cells and the second plurality of storage cells from one another and to electrically connect the first plurality of storage cells or the second plurality of storage cells to the first pin configuration in response to an energy supply request of a first (external) consumer. The first consumer is thus electrically connected via the first pin configuration to the energy store and to the storage cells of the first plurality of storage cells included therein. At the same time, the first consumer may be electrically decoupled from the second plurality of storage cells, so that the second plurality of storage cells is not loaded by the first consumer and is available to supply other external consumers without limitation. In this way, no compromises need to be made when supplying electrical consumers with energy, so that voltage-sensitive electrical consumers may be supplied by a plurality of storage cells, for example, which are not burdened by another (for example power-intensive) consumer. The electrical characteristics of the first consumer may thus be satisfied by the first plurality of storage cells to the best possible extent.

The switching device of the energy store according to an example embodiment of the present invention may be configured to electrically connect the first consumer as a function of its rated voltage to the first plurality of storage cells or to the second plurality of storage cells. In other words, either the actual power consumption of the first electrical consumer may decide whether the switching device considers it helpful to electrically connect the first consumer to the second plurality of storage cell instead of to the first plurality of storage cells or to connect same to the first plurality of storage cells as well as to the second plurality of storage cells instead. Alternatively, the switching device may decide whether the first consumer is rather to be supplied with electrical energy via the first plurality of storage cells and/or via the second plurality of storage cells, if the consumer to be electrically supplied by the energy store and its characteristics are already known even before the electrical energy is received from the energy store. This decision may also be made by taking into account further consumers that are instantaneously supplied with energy from the electrical energy store or are intended to be supplied with energy from the electrical energy store in the future. In this way, the consumers to be electrically supplied may be supplied with electrical energy by the storage cells included in the energy store to the best possible extent and with the least possible conversion losses.

According to an example embodiment of the present invention, each storage cell includes an evaluation unit that is configured to decide, in response to a request and as a function of its individual state of health and/or state of charge, whether it intends to connect to the first electrical pin configuration and/or to the second electrical pin configuration. The evaluation unit may be understood to mean an "intelligence" of the particular storage cell, so that a plurality of intelligent storage cells is located within the energy store according to the present invention. These may form a "swarm intelligence." The need for signaling within an energy store designed according to the present invention may be reduced in this manner. In particular, data communication lines between the storage cells may be dispensed with in that each storage cell includes its particular evaluation unit. The evaluation unit may include a communication unit or be connected to such for the purpose of information technology. In particular, the communication unit may be included in each storage cell similarly to the evaluation unit. Moreover, a particular sensor unit may be linked to the evaluation unit within the storage cell for the purpose of information technology. In this way, the storage cell may optimally monitor its own performance, its own charging state and its own state of health and autonomously decide, as a function of the variables mentioned above, whether or not it participates in the energy supply of an external consumer. With the aid of this modularization, a maintenance of an energy store according to the present invention is flexibly possible, since only the electrical contacts between the old storage cells and a replaced/added storage cell are to be connected, while the communication with a higher-level or possibly further removed evaluation unit is dispensed with.

If the storage cells of the energy store according to the present invention include a particular evaluation unit (and optionally a particular communication unit), the evaluation unit may be configured to decide whether or not it connects to the first electrical pin configuration in response to another storage cell being electrically added to the first electrical pin configuration. In other words, the storage cell may ascertain the switching operation (for example with the aid of its own electrical sensor system) and decide in response thereto once again whether or not it makes sense for it in the present case to participate in the energy supply of the electrical consumer. In other words, the storage cell is capable of making a decentralized decision, with the aid of its evaluation unit together with the energy store according to the present invention, as to whether it is electrically connected to a further storage cell and/or an external electrical consumer via the switching device of the energy store.

The sensor system mentioned above and optionally provided in each storage cell or at least in individual storage cells may have a temperature sensor and alternatively or additionally a voltage sensor (in particular an undervoltage sensor) and alternatively or additionally a sensor/counter for ascertaining a cycle number of the storage cell and alternatively or additionally a current sensor for measuring the cell currents of the storage cell. Alternatively or additionally, the sensor system may carry out a cell spectroscopy of the storage cell in that it electrically loads the storage cell in a predefined manner and ascertains the reaction of the storage cell as a function of the load based on a predefined reference. The result of the ascertainment may be used to draw a conclusion regarding the state of health and/or the cell chemistry.

The energy store according to an example embodiment of the present invention may be provided in an electrically drivable transportation device, for example. Alternatively of additionally, the electrical energy store may be provided in a machine and/or to support an isolated network. The above-mentioned features, feature combinations, and advantages accordingly result for this and other applications, so that reference is made to the above-mentioned explanations in this regard to avoid repetitions.

BRIEF DESCRIPTION OF THE DRAWINGS

Exemplary embodiments of the present invention are described in detail below with reference to the figures.

FIG. 2 shows a schematic illustration of detailed exemplary embodiments for the switching device according to the present invention in the form of switching matrices.

DETAILED DESCRIPTION OF EXAMPLE EMBODIMENTS

Figure 1:
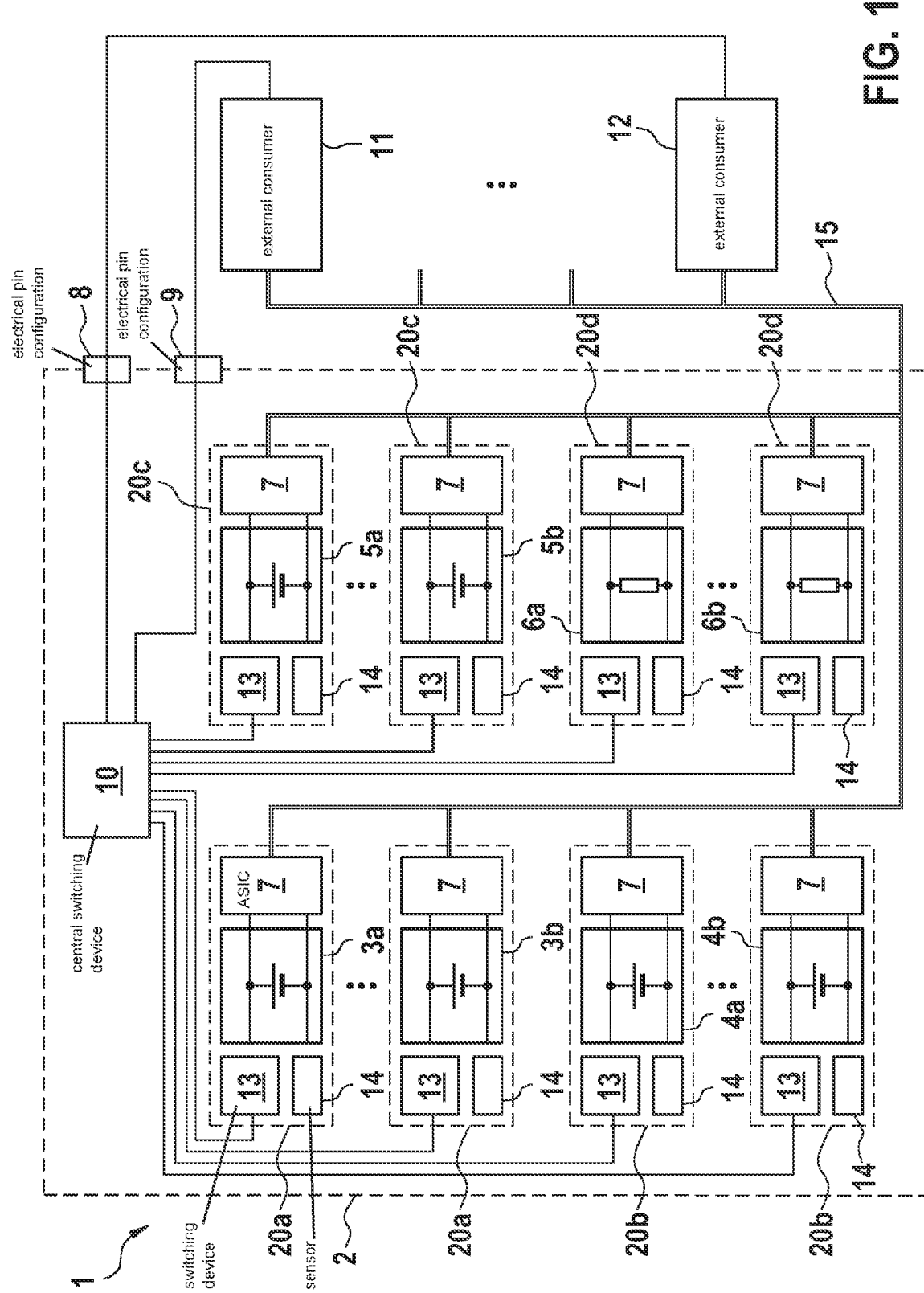
FIG. 1 shows a schematic illustration of one exemplary embodiment of an energy store according to the present invention.

FIG. 1 shows one exemplary embodiment of an energy store 1 according to the present invention, to whose housing 2 two electrical pin configurations 8, 9 having a first electrical consumer 11 and a second electrical consumer 12 are connected. Optional communication bus lines 15 connect consumers 11, 12 to cell modules 20a, 20b, 20c, 20d situated within housing 2. Cell modules 20a are designed as power cells. Their storage cells 3a, 3b, compared to their storage capacity, are capable of outputting comparably high electrical power. In contrast, energy cells 4a, 4b of cell modules 20b are capable of storing a high amount of energy s compared to the power to be maximally output by same. Super caps 5a, 5b of cell modules 20c are configured to output in the short term an extremely high power at particularly low electrical losses and at a lower capacity. In addition, cell modules 20d are provided with shunts 6a, 6b that illustrate a flexible possibility of converting (destroying) electrical energy within energy store 1 according to the present invention. Switching devices 13 of cell modules 20a through 20d make it possible for ASICs 7 as the evaluation units to electrically connect power cells 3a, 3b, energy cells 4a, 4b, super caps 5a, 5b and shunts 6a, 6b to a central switching device 10. In this way, switching device 10, which is described in detail in connection with FIG. 2, may flexibly use the energies or shunts of cell modules 20a through 20d in order to supply external consumers 11, 12 with electrical energy via electrical pin configurations 8, 9. Sensors 14 within cell modules 20a through 20d allow for the voltages or temperatures as well as the flowing currents within cell modules 20a through 20d to be monitored. Storage cells 3a, 3b, 4a, 4b, 5a, 5b may be moreover checked with the aid of particular sensor system 14 for undervoltage, cycle number, and cell chemistry (for example with the aid of a cell spectroscopy). Particular ASIC 7 of cell modules 20a through 20d may receive or communicate information about the instantaneous or the intended operating condition of external consumers 11, 12 via communication bus 15. Information about the condition of cell modules 20a through 20d as well as the previous communication may be stored by ASIC 7 of particular cell module 20a through 20d. Moreover, ASIC 7 may store information about cell profiles and behavioral models for cell modules 20a through 20d.

FIG. 2 shows a possible implementation of an energy store 1 according to the present invention that includes a plurality of cell modules 20a through 20b according to FIG. 1 and a switching device 10 in the form of a switching matrix illustrated in detail. The first plurality of storage cells may be bridged within cell modules 20a or 20b via a particular switch S. Electrical contacts 8a, 8b or 9a, 9b of electrical pin configurations 8, 9 situated outside at the housing (not illustrated) may be flexibly electrically connected via the plurality of switches provided within switching device 10 to any arbitrary number of cell modules 20a, 20b and thus be flexibly supplied with energy by a suitable plurality of storage cells.

In other words, FIG. 2 illustrates one possible implementation of the dynamic interconnections of the battery cells on the battery string. In this case, each cell controls the switch assigned to it. A string refers to the switches illustrated within switching device 10 on top of one another in each case. In these switches, the cells of cell modules 20a, 20b may be dynamically suspended. If none of cell modules 20a, 20b decides to electrically latch in the particular string, short-circuit switch S automatically closes. In this case, the strings may generate different voltages using different storage cells. A feedback via the joint bus (see FIG. 1) makes it possible for individual cell modules 20a, 20b to make the decision by taking into account the decision of the other cells.

With the aid of the present invention, a decentralized control of the energy flows of an energy store in conjunction with its surroundings is made possible. In this way, the advantage of an optimal matching between energy provision (energy store side) and energy consumption (consumer side) is possible without large-scale central switches, a battery management system, etc. Each energy flow is switched dynamically and takes into account the instantaneous state of the battery cell and the consumer. In this way, the service life of the energy store is increased and the efficiency of the overall system is optimized.

All cells may be operated by the above-named structure at an optimal working point. The cell load may be directed to the instantaneous performance of the cells. In the overall system including active battery packs, central components such as inverters, ECUs, battery management systems (BMS), DC/DC converters, etc., are dispensed with. New systems and system configurations may be compiled very easily. In particular, new vehicle types or electrical system requirements may be satisfied flexibly and on a short-term basis. The system is highly flexible in the case of capacity extensions, the loss of individual cells, in the case of maintenance, interception of cases of error, etc.

Furthermore, the failure of individual cells does no longer result in the failure of the overall system, since it is possible to bridge individual cells. The thermal drifting of individual cells, for example in the case of mechanical damage, may be intercepted by dynamically interconnecting other cells, shunts and consumers. Individual (weak) cells may be identified and individually replaced. The absence of voltage in the case of maintenance work may be ensured at any given time as a result of the individual switches. The charging energy may be optimally distributed among the cells: Few charged cells may take up more energy, the overall charge of the battery pack thus increases faster, by which the charging times are reduced. The range may be increased by efficiently using the stored energy at the particular optimal working point and by mixing energy, power, and super cap cells. The lower load for cyclized cells with regard to the critical cells may be ruled out as a result of the operation at the optimal working point of each cell through deep discharge. It is thus possible to drastically increase the service life of the energy store.

What is claimed is:

1. An energy store, comprising:
    a housing;
    a first plurality of storage cells;
    a second plurality of storage cells;
    a first electrical pin configuration via which electrical energy is feedable from each of the first plurality of storage cells and from each of the second plurality of storage cells to a first energy consumer;
    a second electrical pin configuration via which electrical energy is feedable from each of the first plurality of storage cells and from each of the second plurality of storage cells to a second energy consumer that is different than the first energy consumer;
a switching matrix; and
a system of one or more integrated circuits;
wherein:
the system of one or more integrated circuits is programmed to operate the switching matrix to, with respect to each respective one of the storage cells of the first plurality of storage cells and each respective one of the storage cells of the second plurality of storage cells, control a switching that establishes whether the respective storage cell is electrically coupled to the first electrical pin configuration, including to:
(a) perform an electrical coupling of the respective storage cell to the first electrical pin configuration when the respective storage cell is electrically coupled to the second electrical pin configuration;
(b) perform the electrical coupling of the respective storage cell to the first electrical pin configuration when the respective storage cell is not electrically coupled to the second electrical pin configuration;
(c) perform the electrical coupling of the respective storage cell when any of the other storage cells of the first and second pluralities of storage cells is electrically coupled to the first electrical pin configuration;
(d) perform the electrical coupling of the respective storage cell when the any of the other storage cells of the first and second pluralities of storage cells is not electrically coupled to the first electrical pin configuration;
(e) perform the electrical coupling of the respective storage cell when the any of the other storage cells of the first and second pluralities of storage cells is electrically coupled to the second electrical pin configuration; and
(f) perform the electrical coupling of the respective storage cell when the any of the other storage cells of the first and second pluralities of storage cells is not electrically coupled to the second electrical pin configuration;
the first plurality of storage cells are all simultaneously connectable to the first electrical pin configuration;
the second plurality of storage cells are all simultaneously connectable to the second electrical pin configuration; and
the first plurality of storage cells are connectable to the second plurality of storage cells.

2. The energy store as recited in claim 1, wherein the first pin configuration and the second pin configuration each include at least two electrical contacts, via which the electrical energy from those of the cells that are connected to the contacts is transferable.

3. The energy store as recited in claim 1, wherein the first electrical pin configuration and the second electrical pin configuration are situated outside of the housing.

4. The energy store as recited in claim 1, wherein the first plurality of storage cells includes a plurality of energy cells, and/or the second plurality of storage cells includes a plurality of power cells.

5. The energy store as recited in claim 1, wherein the system of one or more integrated circuits is programmed to control the switching matrix to, in response to an energy supply request of the first consumer:
electrically decouple the first plurality of storage cells and the second plurality of storage cells from one another; and
electrically connect the first plurality of storage cells or the second plurality of storage cells to the first pin configuration.

6. The energy store as recited in claim 1, wherein the system of one or more integrated circuits is programmed to control the switching matrix to, in response to an energy supply request of the first consumer and the second consumer:
electrically decouple the first plurality of storage cells and the second plurality of storage cells from one another;
electrically connect the first plurality of storage cells to the first pin configuration; and
electrically connect the second plurality of storage cells to the second pin configuration.

7. The energy store as recited in claim 5, wherein the system of one or more integrated circuits is programmed to select between controlling the switching matrix to electrically connect the first consumer to the first plurality of storage cells and controlling the switching matrix to electrically connect the first consumer to the second plurality of storage cells depending on a rated voltage of the first consumer.

8. The energy store as recited in claim 1, wherein the system of one or more integrated circuits includes for each storage cell of the first and second pluralities of storage cells a respective processing circuit that is programmed to decide, in response to a request and as a function of the respective storage cell's individual state of health and/or state of charge, whether the respective storage cell is to be connected by the switching matrix to the first electrical pin configuration and/or to the second electrical pin configuration.

9. The energy store as recited in claim 1, wherein the system of one or more integrated circuits includes for each storage cell of the first and second pluralities of storage cells a respective processing circuit that is programmed to decide whether or not the respective storage cell is connected to the first electrical pin configuration in response to another one of the storage cells being electrically added to the first electrical pin configuration.

10. The energy store as recited in claim 1, wherein each storage cell of the first and second plurality of storage cells includes a sensor system that is configured to:
measure a temperature, and/or
measure an undervoltage, and/or
measure a cycle number, and/or
measure cell currents of the storage cell, and/or
carry out a cell spectroscopy of the storage cell.

11. The energy store as recited in claim 1, wherein each storage cell of the first plurality of storage cells is controlled by a respective one of the one or more integrated circuits, which is configured to independently control a respective switch of the switching matrix associated with the respective storage cell, thereby allowing each respective one of the storage cells of the first plurality of storage cells to decide whether the respective storage cell electrically connects to the first energy consumer through the first electrical pin configuration.

12. The energy store as recited in claim 11, wherein each of the one or more integrated circuits is configured to evaluate a state of the respective storage cell that the respective integrated circuit controls and to determine whether to keep the respective switch associated with the respective storage cell in an open or closed position.

13. The energy store as recited in claim 11, wherein the switching matrix includes a first short-circuit switch configured to automatically close when all of the integrated circuits of the first plurality of storage cells are switched to a state of disconnection, thereby allowing electrical energy to be provided from the second plurality of storage cells via the first short-circuit switch.

14. The energy store as recited in claim 13, wherein the operation of the short-circuit switch is based on a monitoring of whether all of the first plurality of storage cells are in a state of disconnection.

15. The energy store as recited in claim 13, wherein:
each storage cell of the second plurality of storage cells is also controlled by a respective one of the one or more integrated circuits, which is configured to independently control a respective switch of the switching matrix associated with the respective storage cell, thereby allowing each respective one of the storage cells of the second plurality of storage cells to decide whether the respective storage cell electrically connects to the first energy consumer through the first electrical pin configuration; and
the switching matrix further includes a second short-circuit switch configured to automatically close when all integrated circuits of the second plurality of storage cells are switched to a state of disconnection, thereby allowing electrical energy to be provided from the first plurality of storage cells via the second short-circuit switch.

16. The energy store as recited in claim 1, wherein:
the one or more integrated circuits include a plurality of integrated circuits, each of the plurality of integrated circuits corresponding to a respective one of the storage cells of the first plurality of storage cells and the second plurality of storage cells; and
the plurality of integrated circuits are configured to communicate with one another to assess an overall operational status of the first and second pluralities of storage cells, the plurality of integrated circuits thereby performing coordinated decision-making regarding connections to the first and second electrical pin configurations.

17. The energy store as recited in claim 1, wherein the switching matrix includes a plurality of switches, control of which is decentralized, the plurality of switches each controlling a respective connection of a respective one of the storage cells to the first and second energy consumers.

18. The energy store as recited in claim 17, wherein the first and second pluralities of storage cells are divided into a plurality of groups, with a first one of the groups being connected in series to a second one of the groups so that, for the second one of the groups to have a connection to one of the first and second energy consumers, the connection must pass through the first one of the groups.

19. The energy store as recited in claim 18, wherein:
the switching matrix further includes a first short circuit switch assigned to the first one of the groups of storage cells collectively; and
the energy store is adapted for all of the cells of the first one of the groups to decide to not connect the first and second energy consumers, resulting in a state in which the switches of all of the cells of the first one of the groups are open, the state causing the first short circuit switch to automatically close so that the storage cells of the second one of the groups is connectable to the first and second energy consumers via the closed first short circuit switch of the first one of the groups, when all of the energy cells of the first one of the groups is disconnected from the first and second energy consumers due to their respective switches being open.

20. The energy store as recited in claim 19, wherein:
all of the storage cells of the first one of the groups are connectable in parallel to one another and not in series to one another for connection of the storage cells of the first one of the groups to the first and second energy consumers; and
each storage cell of the first one of the groups is controlled by a respective one of the one or more integrated circuits, which is configured to independently control a respective switch of the switching matrix associated with the respective storage cell, thereby allowing each respective one of the storage cells of the first one of the groups to independently decide whether the respective switch of the respective storage cell electrically connects the respective storage cell to the first and second energy consumers.

* * * * *